(12) United States Patent
Bhatt et al.

(10) Patent No.: US 10,715,520 B2
(45) Date of Patent: Jul. 14, 2020

(54) SYSTEMS AND METHODS FOR DECENTRALIZED BIOMETRIC ENROLLMENT

(71) Applicant: MASTERCARD INTERNATIONAL INCORPORATED, Purchase, NY (US)

(72) Inventors: Sumeet Bhatt, Jericho, NY (US); Ashfaq Kamal, Stamford, CT (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 246 days.

(21) Appl. No.: 15/583,147

(22) Filed: May 1, 2017

(65) Prior Publication Data

US 2018/0167386 A1    Jun. 14, 2018

Related U.S. Application Data

(60) Provisional application No. 62/431,609, filed on Dec. 8, 2016.

(51) Int. Cl.
*H04L 29/06* (2006.01)
*G06F 16/955* (2019.01)
(Continued)

(52) U.S. Cl.
CPC ........ *H04L 63/0861* (2013.01); *G06F 16/955* (2019.01); *G06F 21/32* (2013.01);
(Continued)

(58) Field of Classification Search
CPC . H04L 63/0861; H04L 63/0853; H04L 63/10; H04L 63/0876; H04L 63/062;
(Continued)

(56) References Cited

U.S. PATENT DOCUMENTS 7,225,338 B2    5/2007    Khan et al.
7,367,049 B1    4/2008    Robinson et al.
(Continued)

FOREIGN PATENT DOCUMENTS

EP    2037421 A1    3/2009
GB    2531095 A     4/2016
(Continued)

OTHER PUBLICATIONS

International Search Report and Written Opinion for Application No. PCT/US2017/062519 dated Mar. 2, 2018 (11 pages).
(Continued)

*Primary Examiner* — Kevin Bechtel
*Assistant Examiner* — Quazi Farooqui
(74) *Attorney, Agent, or Firm* — Michael Best & Friedrich LLP (57) ABSTRACT

Systems, methods, and non-transitory computer readable media decentralizes biometric enrollment. A server receives a request to enroll a user for biometric authentication in association with a unique ID, generates an activation code corresponding to the unique ID, and sends the activation code to the user. A user device receives and validates the activation code. If the activation code is valid, the user device is enabled to: capture at least one biometric image, and to send the biometric image to the server. The server receives at least one biometric image from the user device in response to the activation code and extracts features from at least one biometric image to generate a biometric template based upon the extracted features to enroll the user for biometric authentication without requiring the user to visit a central location to provide at least one biometric image.

16 Claims, 4 Drawing Sheets

(51) Int. Cl.
*G06Q 20/00* (2012.01)
*G06F 21/32* (2013.01)
*G06Q 20/10* (2012.01)
*G06Q 20/18* (2012.01)
*G06Q 20/34* (2012.01)
*G06Q 20/40* (2012.01)

(52) U.S. Cl.
CPC ......... *G06Q 20/00* (2013.01); *G06Q 20/1085* (2013.01); *G06Q 20/18* (2013.01); *G06Q 20/354* (2013.01); *G06Q 20/40145* (2013.01); *H04L 63/0853* (2013.01); *H04L 63/10* (2013.01); *G06F 2221/2117* (2013.01); *H04L 63/062* (2013.01); *H04L 63/0876* (2013.01)

(58) Field of Classification Search
CPC ....... H04L 29/06; G06F 16/955; G06F 21/32; G06F 2221/2117; G06Q 20/1085; G06Q 20/40145; G06Q 20/354; G06Q 20/18
USPC .................. 726/6, 5, 16, 18, 19; 713/169
See application file for complete search history.

(56) References Cited

U.S. PATENT DOCUMENTS

| | | | |
|---|---|---|---|
| 8,489,513 | B2 | 7/2013 | Bishop et al. |
| 8,595,075 | B2 | 11/2013 | de Sylva |
| 9,430,629 | B1 * | 8/2016 | Ziraknejad .............. G06F 16/51 |
| 9,953,149 | B2 | 4/2018 | Tussy |
| 10,154,029 | B1 | 12/2018 | Griffin |
| 2001/0011680 | A1 | 8/2001 | Soltesz et al. |
| 2008/0015994 | A1 | 1/2008 | Bonalle et al. |
| 2009/0076966 | A1 | 3/2009 | Bishop et al. |
| 2010/0175114 | A1 | 7/2010 | Little |
| 2010/0318783 | A1 | 12/2010 | Raj et al. |
| 2011/0191249 | A1 | 8/2011 | Bishop et al. |
| 2012/0293642 | A1 * | 11/2012 | Berini .................. G06F 21/34 348/77 |
| 2014/0081857 | A1 | 3/2014 | Bonalle et al. |
| 2014/0310182 | A1 * | 10/2014 | Cummins .......... G06Q 20/4012 705/71 |
| 2014/0337221 | A1 | 11/2014 | Hoyos |
| 2015/0058931 | A1 | 2/2015 | Miu et al. |
| 2015/0227937 | A1 | 8/2015 | Giles |
| 2016/0226868 | A1 | 8/2016 | Harding |
| 2018/0091505 | A1 * | 3/2018 | Farrell ................ H04L 63/0428 |
| 2018/0165676 | A1 | 6/2018 | Bhatt et al. |
| 2018/0167387 | A1 | 6/2018 | Bhatt et al. |
| 2018/0285868 | A1 * | 10/2018 | O'Hara ............. G06Q 20/3276 |

FOREIGN PATENT DOCUMENTS

| | | | |
|---|---|---|---|
| WO | 2004/031920 A1 | 4/2004 | |
| WO | 2013/051010 A2 | 4/2013 | |
| WO | WO-2017055373 A1 * | 4/2017 | ......... G06Q 20/3276 |
| WO | 2018/106430 A1 | 6/2018 | |
| WO | 2018/106431 A1 | 6/2018 | |
| WO | 2018/106432 A1 | 6/2018 | |

OTHER PUBLICATIONS

International Search Report and Written Opinion for Application No. PCT/US2017/062525 dated Mar. 2, 2018 (14 pages).
International Search Report and Written Opinion for Application No. PCT/US2017/062527 dated Feb. 28, 2018 (14 pages).
Jordaan et al., "A Biometrics-Based Solution to Combat SIM Swap Fraud," ECCV 2016 Conference, 2016, Springer International Publishing, Cham, pp. 70-87.

* cited by examiner

SYSTEMS AND METHODS FOR DECENTRALIZED BIOMETRIC ENROLLMENT

RELATED APPLICATIONS

This application claims priority to U.S. Patent Application Ser. No. 62/431,609, titled "Systems and Methods for Decentralized Biometric Enrollment, Smartcard Biometric Enrollment, and Biometric Authentication Using Existing Databases," filed Dec. 8, 2016, incorporated herein by reference in its entirety. This application is co-filed with co-owned patent application Ser. No. 15/583,085, titled "Systems and Methods for Smartcard Biometric Enrollment," and co-owned patent application Ser. No. 15/583,174, titled "Systems and Methods for Biometric Authentication Using Existing Databases," both of which are incorporated herein by reference in their entirety.

BACKGROUND

When initiating a communication, a user is often asked for authentication. For example, where the user wishes to secure items over the Internet, the user is asked for authentication (i.e., proof that the user initiating the communication is who they say they are) before remuneration occurs. Such authentication is typically a password or security code that is associated with an identity of an account used to obtain the merchandise or service. However, biometric authentication is becoming an increasingly popular method of identity verification. Before any such biometric authentication may occur, the individual to be authenticated must provide biometric samples (e.g., images) for generating biometric templates that are used for authentication. This requires the individuals to present themselves at a particular location where their biometric images may be captured together with other evidence of their identity. For example, the individual may be asked to visit a particular location where biometric capture equipment is used to capture and record images of one or more biometric features of the individual, where the identity of the individual is verified by photo ID documents. The captured biometric images and/or biometric templates generated therefrom, are stored to allow future authentication of the individual from subsequently captured biometric images.

SUMMARY

One embodiment relates to a method for decentralized biometric enrollment. A server receives a request to enroll a user for biometric authentication in association with a unique ID, generates an activation code corresponding to the unique ID, and sends the activation code to the user. The activation code enables a user device to capture at least one biometric image. The server receives the at least one biometric image from the user device in response to the activation code and extracts features from the at least one biometric image to generate a biometric template based upon the extracted features to enroll the user for biometric authentication without requiring the user to visit a central location to provide the at least one biometric image.

Another embodiment relates to another method for decentralized biometric enrollment. A user device receives an activation code corresponding to a unique ID that uniquely identifies the user to a service and validates the activation code. If the activation code is valid, the user device is enabled to capture at least one biometric image, and to send the biometric image to a server. The server extracts features from the at least one biometric image and generates a biometric template based upon the extracted features to enroll the user for biometric authentication using the biometric template.

Another embodiment relates to a server that decentralizes biometric enrollment. The server includes a processor and a memory communicatively coupled with the processor. The memory stores machine readable instructions that when executed by the processor perform the steps of: receiving a request to enroll a user for biometric authentication in association with a unique ID; generating an activation code corresponding to the unique ID; sending the activation code to the user, the activation code enabling a user device to capture at least one biometric image; receiving the at least one biometric image in response to the activation code; extracting features from the at least one biometric image; and generating a biometric template based upon the extracted features to enroll the user for biometric authentication without requiring the user to visit a central location to provide the at least one biometric image.

Another embodiment relates to a non-transitory computer readable medium with computer executable instructions stored thereon that is executed by a processor of a user device to perform the method of decentralized biometric enrollment. The non-transitory computer readable medium includes instructions for receiving an activation code generated by a server and corresponding to a unique ID that uniquely identifies the user to a service; instructions for validating the activation code; instructions for capturing at least one biometric image when the activation code is valid; and instructions for sending the biometric image to the server when the activation code is valid. The server extracts features from the at least one biometric image and generates a biometric template based upon the extracted features to enroll the user for biometric authentication using the biometric template.

DETAILED DESCRIPTION OF THE EMBODIMENTS

Figure 1:
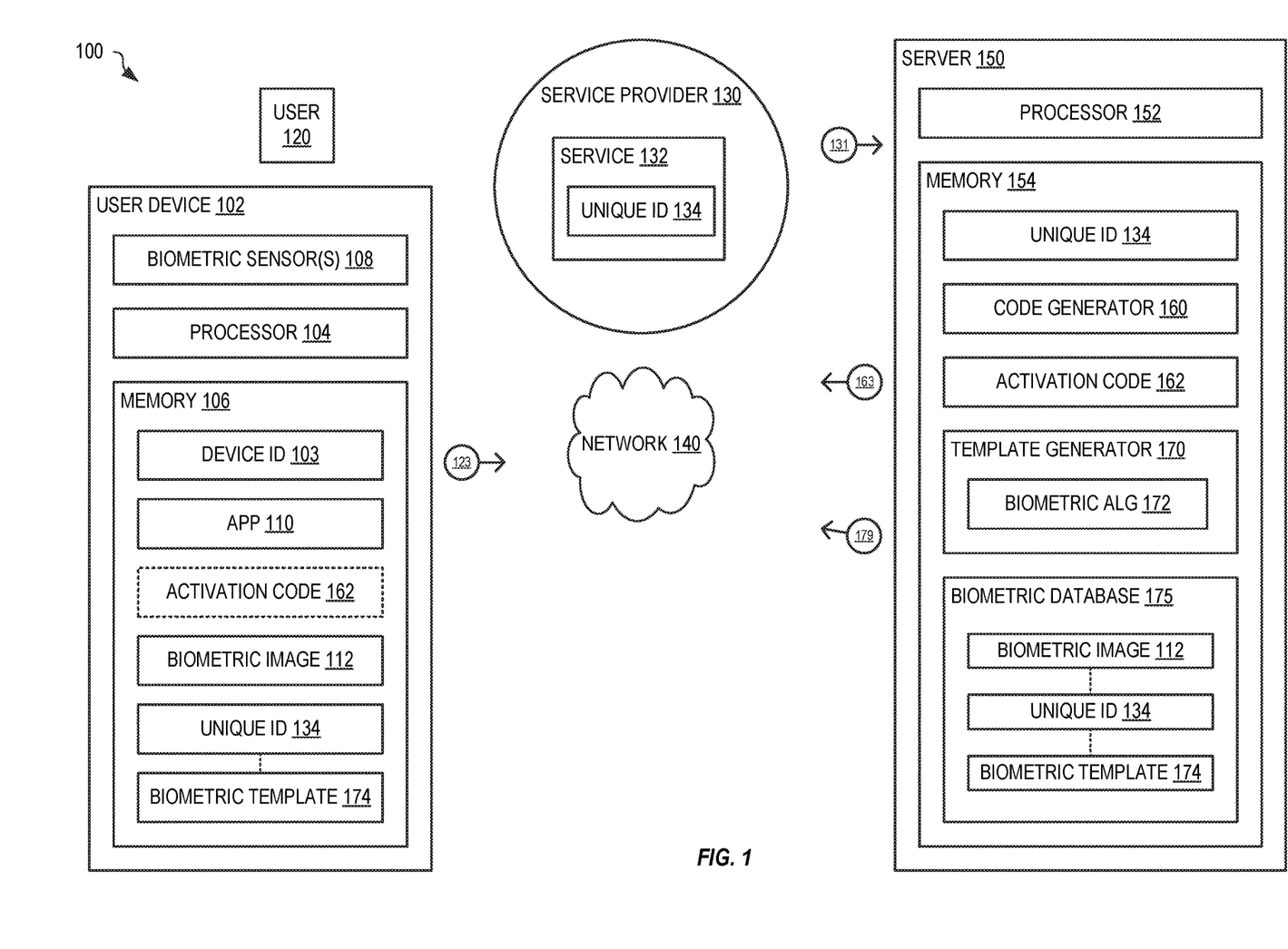
FIG. 1 shows one example system for decentralized biometric enrollment, in an embodiment.

FIG. 1 shows one example system 100 for decentralized biometric enrollment. A service provider 130 provides a service 132 for which user 120 wishes to enroll in biometric authentication. In embodiments, user 120 uses a unique identifier (ID) 134 for using service 132. For example, service 132 represents one or more of a financial service (e.g., a bank account, an investment authority), a building access control, a data access service, and so on. Accordingly, unique ID 134 represents one or more of an account number (e.g., a bank account number, a financial card number, a customer account number, and so on), an access number, a social security number, and so on.

In embodiments, where service provider 130 is a financial institution, it is envisioned that service provider 130 complies with "know your customer" (KYC), and has established information to verify that the person claiming to be user 120 is not an imposter. As known to those skilled in the art, KYC is the process of a business, identifying and verifying the identity of its clients. See for example: Wikipedia topic "Know your customer". Also, KYC may refer to the bank regulation which governs these activities. User 120 is already known to service provider 130 and may utilize one or more of a password, PIN, security questions, and so on, to uniquely identify themselves to service provider 130. Where service provider 130 maintains a website that user 120 accesses to view and control their account, service provider 130 requires user 120 to identify themselves (e.g., enter a username, password, PIN, and answer one or more security questions) as proof of identity. It is envisioned that service 132 would particularly benefit from increased security provided by biometric authentication of user 120.

System 100 includes a server 150 that communicates with a user device 102 of user 120. User device 102 is a computer that includes one or more biometric sensors 108. User device 102 is selected from the group including: a smart phone, a smart watch, a tablet computer, desktop computer, and so on. Biometric sensor(s) 108 may represent one or more of an image sensor (e.g., a camera) for capturing facial images and a fingerprint reader for capturing fingerprint images. User device 102 includes a processor 104 that is communicatively coupled with a memory 106 and biometric sensor(s) 108. Processor 104 may represent one or more digital processors. Memory 106 may represent one or both of volatile memory (e.g., RAM, DRAM, and SRAM, and so on) and non-volatile memory (e.g., ROM, EPROM, EEPROM, Flash memory, magnetic storage, optical storage, network storage, and so on). Memory 106 stores an app 110 that includes machine readable instructions that are executed by processor 104 to provide the functionality of user device 102 as described herein.

Server 150 is a computer that includes at least one processor 152 communicatively coupled to a memory 154. In embodiments, processor 152 may represent one or more digital processors. Memory 154 may represent one or both of volatile memory (e.g., RAM, DRAM, and SRAM, and so on) and non-volatile memory (e.g., ROM, EPROM, EEPROM, Flash memory, magnetic storage, optical storage, network storage, and so on). Server 150 also may be implemented as a plurality of networked servers, as known in the art, without departing from the scope hereof. In embodiments, server 150 may be part of a financial transaction entity (e.g., MasterCard, Visa, or the like) or may be part of service provider 130.

A code generator 160 includes machine readable instructions that are stored in memory 154 and executed by processor 152 to generate an activation code 162 (described below) based upon a unique ID 134. Code generator 160 is executed by processor 152 in response to a request for enrollment of user 120 for biometric authentication for service 132, where user 120 uses a unique ID 134 for service 132. For example, when user 120 signs-up for service 132, service provider 130 may automatically enroll user 120 for biometric authentication for service 132. In another example, user 120 may request enrollment in biometric authentication for service 132.

In embodiments, code generator 160 may be run selectively, such that activation code 162 is only generated for users (e.g., user 120) authorized to enroll for biometric authentication in association with unique ID 134. Activation code 162 thereby restricts enrollment for biometric authentication to users that are authorized to enroll. For example, user 120 logs in to service provider 130, using existing credentials (e.g., username and password) to verify themselves to service provider 130. Service provider 130 may ask additional security questions to verify that user 120 is who they claim to be. For example, where service provider 130 is a bank, service provider 130 complies with KYC and may use previously established information to verify that they are dealing with user 120 and not an imposter. In certain embodiments, app 110 is associated with service provider 130 and includes a first level of verification of user 120. For example, app 110 may utilize a password or PIN configured through service provider 130 for using service 132. To use app 110, user 120 is thus validated at this first level, thereby preventing use of app 110 on user device 102 by unauthorized persons.

Once user 120 is verified by service provider 130, service provider 130 may instruct (e.g., by sending a secure message 131 to server 150) code generator 160 to generate activation code 162 corresponding to unique ID 134 for user 120, indicating a method of delivery of the activation code 162, such as via a previously defined email address or a previously registered mobile number.

Activation code 162 may be specifically encoded for use by user 120 for service 132 based upon unique ID 134, and may also be specifically tied to one or more of app 110 and/or user device 102. For example, activation code 162 may be encoded to include unique ID 134 and/or a mobile number (or other unique identification value) of user device 102 based upon previously registered information. Such encoding ensures that the activation code is used only with the intended unique ID 134, and thus only used by user 120 and/or user device 102. For example, app 110 may decode activation code 162 to determine an encoded unique ID for comparison to unique ID 134 stored within user device 102. When the encoded unique ID does not match Unique ID 134, the activation code is not validated and app 110 does not allow the user to capture biometric images. In another example, app 110 may decode activation code 162 to determine an encoded device ID for comparison to a unique device ID 103 of user device 102. When the encoded device ID does not match unique device ID 103 of user device 102, the activation code is not validated and app 110 does not allow the user to capture biometric images. Unique device ID 103 is for example one or more of a serial number, a MAC address, a telephone number, or other identifier that is unique to user device 102.

In embodiments, app 110 only requests biometric images from user 120 when an entered or received activation code is validated. For example, user device 102 may receive activation code 162 (e.g., electronically in message 163) from server 150 or the activation code may be entered into user device 102 by user 120, wherein app 110 validates the entered activation code, such as by contacting server 150 and receiving an indication as to validity of the activation code from server 150, or by validating encoded information, such as unique ID 134 and/or a mobile number of user device 102.

Once generated by code generator 160, activation code 162 is sent to user 120. For example, activation code 162 is sent electronically to user 120 via one or more of text (e.g., short message service (SMS)), email, push notification, and so on, based upon contact information of record for user 120 for service 132. In embodiments, enrollment for biometric authentication may only occur for users that have received activation code 162. When received by, or entered into, user device 102, activation code 162 may be temporarily stored in memory 106.

As indicated above, app 110 validates activation code 162 prior to initiating biometric image capture of user 120. More specifically, in embodiments, app 110 may decode unique ID 134 from activation code 162 for comparison to an identifier entered by user 120; where the entered identifier and the decoded unique ID do not match, app 110 determines that the activation code 162 is invalid. In another example, where activation code 162 is entered into app 110 by the user, app 110 sends the entered activation code to server 150 for validation. For example, server 150 may compare the entered activation code with activation code 162 generated by code generator 160 and determine that that the activation code is valid when the entered activation code matches activation code 162 within server 150. Server 150 then responds to app 110 to indicate whether the entered activation code is valid. Where activation code 162 is received electronically within app 110 from server 150, app 110 may not validate activation code 162.

Once activation code 162 is determined to be valid, app 110 first determines biometric types that may be captured by biometric sensor(s) 108 within user device 102, and then interacts with user 120 to allow user 120 to select the type (e.g., fingerprint image, facial image, iris image, and so on) of biometric to use for authentication. In one example, where user device 102 is a smart phone, a forward facing camera of the smart phone may be used for biometric imaging. Where user 120 elects to use a facial image for authentication, app 110 activates the biometric sensor 108 (in particular, the forward facing camera) and provides instructions and/or directions for user 120 to position the camera to capture biometric image 112 to include the face of user 120. Where user 120 elects to use a fingerprint for authentication, app 110 activates the biometric sensor 108 (this time, in particular, a fingerprint sensor) and app 110 provides instructions and/or directions for user 120 to capture at least one biometric image 112 of at least one fingerprint.

In certain embodiments, the type of biometric to use for authentication is preselected (e.g., by service provider 130) and app 110 does not give user 120 a choice of biometrics to select from. App 110 may determine the types of biometric sensor(s) 108 available on user device 102, and send the available types to server 150, wherein server 150 may identify the preselected biometric type therefrom. App 110 then provides instructions and directions to user 120 for capturing biometric image 112 of the preselected biometric type.

Figure 2:
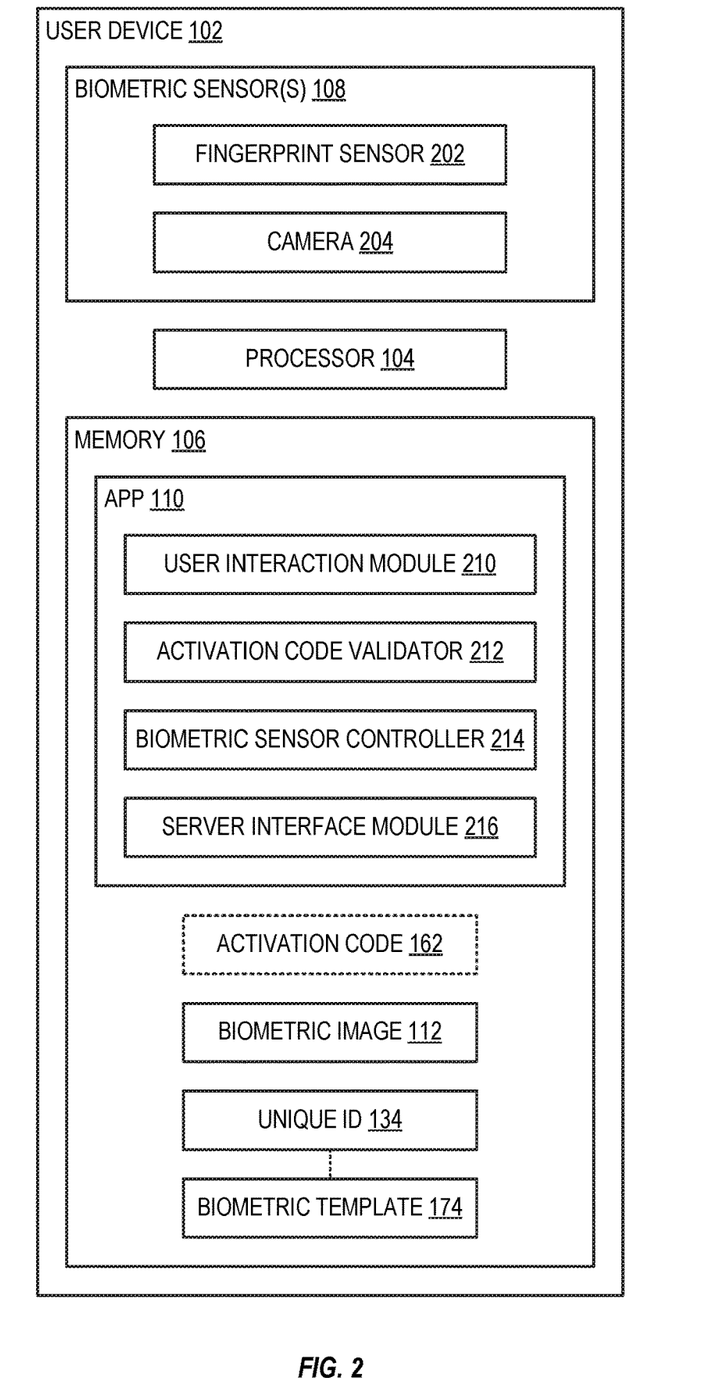
FIG. 2 is a schematic showing the user device of FIG. 1 in further detail, in an embodiment.

FIG. 2 is a schematic showing user device 102 of FIG. 1 in further detail. Biometric sensors 108 include a fingerprint sensor 202 and a camera 204. App 110 includes a user interaction module 210 that includes machine readable instructions that are executed by processor 104 to interact with user 120. For example, user interaction module 210 may also include instructions and directions that are presented to user 120 when receiving and/or retrieving activation code 162 and when collecting biometric image 112 from user 120.

App 110 also includes an activation code validator 212 that has machine readable instructions that are executed by processor 104 to determine whether an entered activation code is valid. In one embodiment, activation code validator 212 sends the entered activation code to server 150 for validation, wherein server 150 maintains a database of issued/valid activation codes and may thereby determine whether the entered activation code is valid. In another embodiment, activation code 162 is encoded with validation information that is evaluated by activation code validator 212 to determine whether the entered activation code is valid.

App 110 also includes a biometric sensor controller 214 that cooperates with user interaction module 210 to capture biometric image 112 from user 120 using biometric sensor(s) 108.

App 110 also includes a server interface module 216 that cooperates with one or more of user interaction module 210 and activation code validator 212 to communicate with server 150. For example, server interface module 216 sends an entered activation code to server 150 for validation and receives an indication of valid or invalid from server 150. In another example, server interface module 216 sends biometric image 112, once captured by user interaction module 210 and biometric sensor controller 214, to server 150 in message 123 and receives a biometric template 174 from server 150 in message 179. In this example, user device 102 also operates as an authentication device that uses biometric template 174 to authenticate user 120. For example, user device 102 may interact with a web-based merchant, wherein a payment from user 120 to the merchant through service 132 is authenticated by user device 102. In certain embodiments, template generator 170 and biometric algorithms 172 are implemented within user device 102 (e.g., within app 110) such that biometric template 174 is generated within user device 102.

In one embodiment, biometric template 174 is encrypted specifically for use on user device 102, wherein biometric template 174 will not authenticate biometric images when used on another device.

Figure 3:
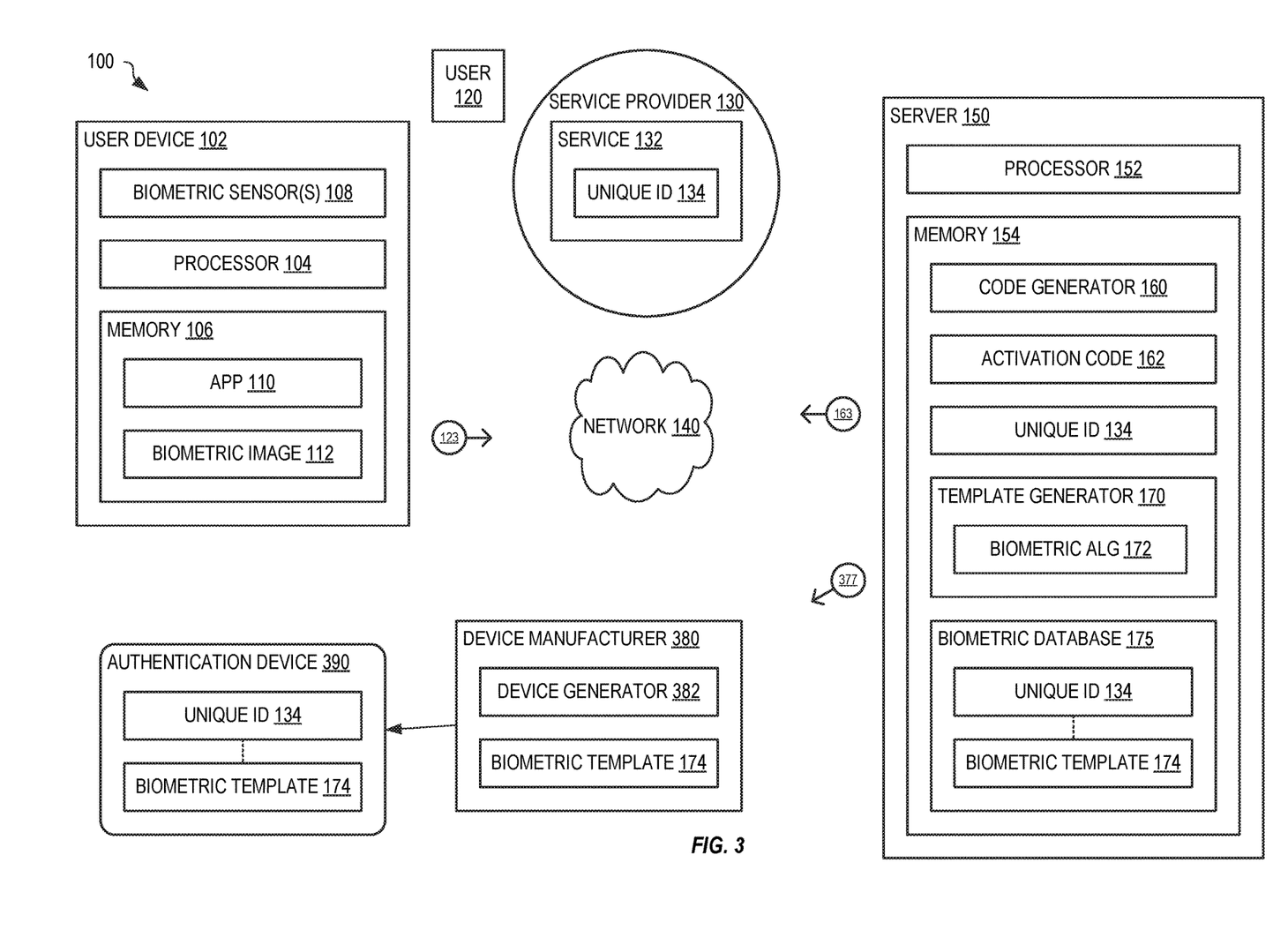
FIG. 3 shows one example system for decentralized biometric enrollment of a separate authentication device, in an embodiment.

FIG. 3 shows system 100 of FIG. 1 configured for decentralized biometric enrollment of a separate authentication device 390. In the embodiment of FIG. 3, server 150 and user device 102 cooperate to capture biometric image 112 and generate biometric template 174. Template generator 170 then sends biometric template 174 to a device manufacturer 380 that produces authentication device 390. That is, biometric template 174 may be used in devices other than user device 102 to authenticate user 120. Authentication device 390 represents any device that includes biometric authentication capability and may represent one or more of a smart phone, a computer, a tablet, a smart payment card (e.g., a biometric contactless payment card with integrated fingerprint sensor), a door lock, a car lock and/or ignition control, a security alarm panel, and so on. In the example of FIG. 3, a first device (user device 102) with biometric capture capability is used to configure a second device (authentication device 390) for authenticating a user (e.g., user 120).

During configuration, device manufacturer 380 receives biometric template 174 from template generator 170 of server 150 in message 377. In one example, device manufacture 380 requests biometric template 174 from serve 150 when needed for manufacture of authentication device 390. In another example, server 150 sends biometric template 174 to device manufacture 380 when authentication device 390 is requested for user 120. Device manufacturer 380 uses a device generator 382 that has machine readable instructions executable by a processor to include biometric template 174 on authentication device 390. For example, device manufacturer 380 may configure a previously made device or may manufacture a new device (e.g., new biometric contactless payment card with integrated fingerprint sensor) with biometric template 174. Where authentication device 390 is a biometric contactless payment card with integrated fingerprint sensor, once configured by device manufacturer 380, it is delivered to user 120 and used by user 120 to make biometric authenticated transactions. For example, upon using the biometric contactless payment card, user 120 touches the integrated fingerprint sensor and a fingerprint image is captured and matched to biometric template 174 on authentication device 390 to authenticate a transaction.

It should be noted that biometric template 174 may be sent to both manufacturer 380 and to user device 102 as shown in the embodiment of FIG. 1. That is, interaction of user 120 with user device 102 may result in configuring both user device 102 and authentication device 390 for biometric authentication of user 120.

Figure 4:
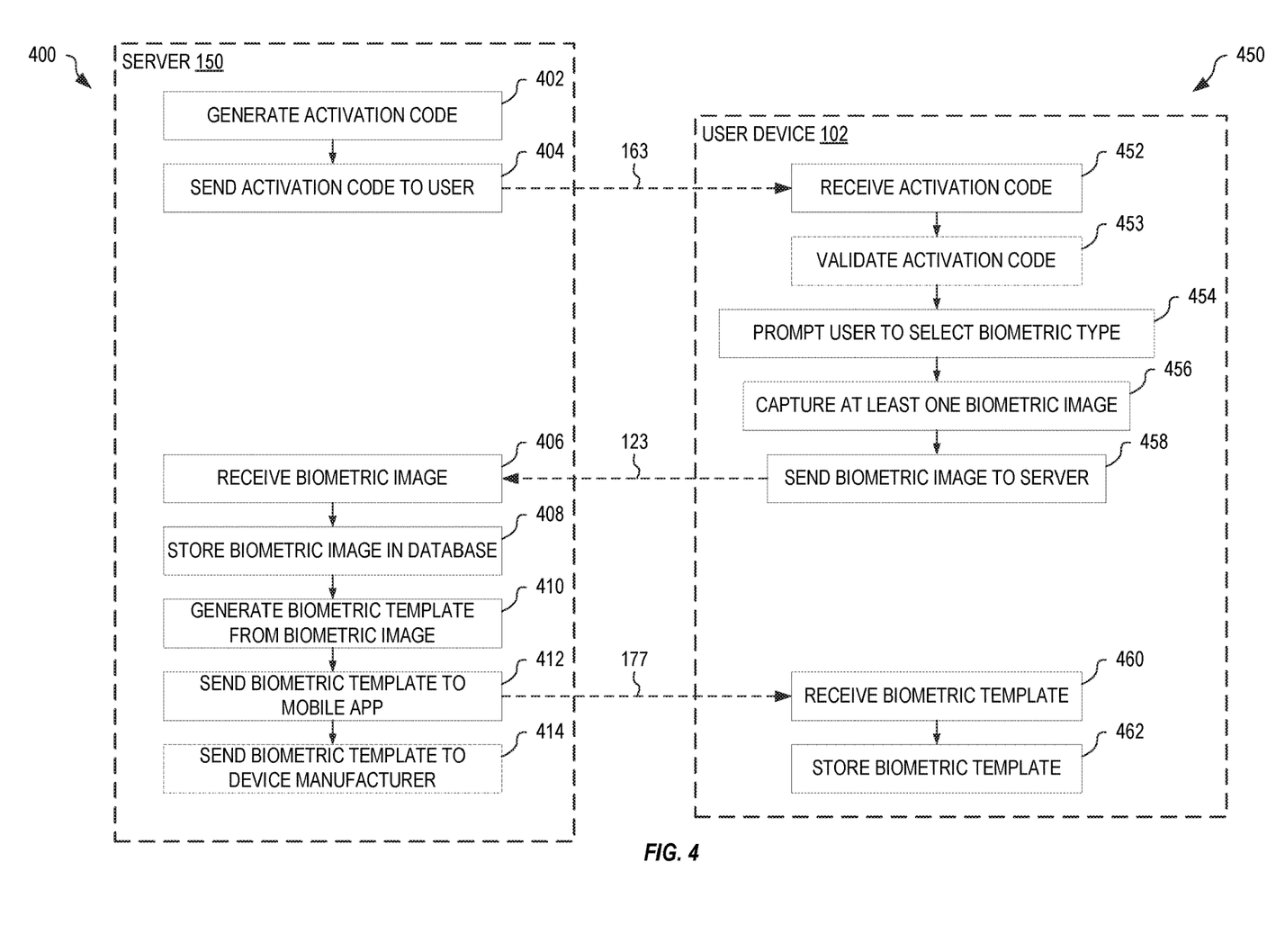
FIG. 4 is a flowchart illustrating interaction between example methods of the server and the user device of FIG. 1, to decentralize biometric enrollment, in an embodiment.

FIG. 4 is a flowchart illustrating interaction between example methods (i.e., methods 400 and 450 respectively) of server 150 and user device 102 of FIG. 1, to decentralize biometric enrollment. FIGS. 1, 2, 3, and 4 are best viewed together with the following description. In the embodiment of FIG. 4, user device 102 receives activation code 162 electronically in message 163 from server 150, and thus has no need to validate the activation code further with server 150.

Methods 400 and 450 are invoked when service provider 130 initiates enrollment in biometric authentication for service 132. In step 402, method 400 generates an activation code. In one example of step 402, code generator 160 generates activation code 162 based upon unique ID 134 of service 132 used by user 120. In step 404, method 400 sends the activation code to the user. In one example of step 404, code generator 160 sends activation code 162 to user 120 using message 163 (e.g., e-mail or text messaging) to user device 102. Method 400 then waits to receive at least one biometric image corresponding to activation code 162 from user device 102.

In step 452, method 450 receives an activation code. In one example of step 452, app 110 receives activation code 162 in message 163 from server 150. In step 453, method 450 validates the received activation code.

In step 454, method 400 prompts the user to select a biometric type. In one example of step 454, user interaction module 210, executed by processor 104, presents a list of biometric types that may be captured by user device 102. In one embodiment, where the biometric type is preselected, step 454 is omitted.

In step 456, method 400 captures at least one biometric image. In one example of step 456, user interaction module 210 provides instructions and directions to user 120 and cooperates with biometric sensor controller 214 to capture biometric image 112 of the selected (or preselected) biometric type. In step 458, method 450 sends the biometric image to the server. In one example of step 458, app 110 sends biometric image 112 in message 123 to server 150.

In step 406, method 400 receives the biometric image. In one example of step 406, template generator 170 receives message 123 containing biometric image 112 from user device 102 via network 140. In step 408, method 400 stores the biometric image within a database. In one example of step 408, template generator 170 stores biometric image 112 within biometric database 175 in association with unique ID 134.

In step 410, method 400 generates a biometric template from the biometric image. In one example of step 410, template generator 170 utilizes one or more biometric algorithms 172 to process biometric image 112 and generate biometric template 174. In step 412, method 400 sends the biometric template of step 410 to the mobile app. In one example of step 412, template generator 170 sends biometric template 174 to app 110 of user device 102 in message 179. In embodiments, template generator 170 sends biometric template 174 to device manufacturer 380.

In step 460, method 450 receives the biometric template. In one example of step 460, server interface module 216 receives biometric template 174 within message 179 from server 150. In step 462, method 450 stores the biometric template. In one example of step 462, server interface module 216 stores biometric template 174 within memory 106 in association with unique ID 134.

In step 414, method 400 sends the biometric template to a device manufacturer. In one example of step 414, template generator 170 sends biometric template 174 to device manufacturer 380 where biometric template 174 is incorporated into authentication device 390.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for decentralized biometric enrollment, comprising:
receiving, within a server, a request to enroll a user for biometric authentication in association with a unique device identifier (ID) of a user device;
generating, within the server, an activation code corresponding to the unique device ID by encoding the activation code based upon one or both of an app running on the user device and the unique device ID;
sending the activation code to the user, the activation code enabling the user device to capture at least one biometric image;
receiving, from the user device, the at least one biometric image in response to the activation code;
extracting features from the at least one biometric image; and
generating a biometric template based upon the extracted features to enroll the user for biometric authentication without requiring the user to visit a central location to provide the at least one biometric image.

2. The method of claim 1, further comprising sending, from the server, the biometric template to the user device to enable the user device to authenticate the user.

3. The method of claim 1, further comprising sending, from the server, the biometric template to a device manufacturer server for configuration of the biometric template into an authentication capable device.

4. The method of claim 3, the authentication capable device being a security device requiring authentication of the user prior to operation.

5. The method of claim 1, wherein generating the activation code further includes encoding the unique device identifier (ID) of the user device within the activation code, wherein the app running on the user device validates the activation code based upon the unique device ID.

6. A method for decentralized biometric enrollment, comprising:
receiving, with a user device, an activation code corresponding to a unique device identifier (ID) of the user device, the activation code uniquely identifying a user to a service, and the activation code based upon one or both of an app running on the user device and the unique device ID;

validating the activation code;
if the activation code is valid, the user device enabled to:
capture at least one biometric image; and
send the at least one biometric image to a server;
wherein the server extracts features from the at least one biometric image and generates a biometric template based upon the extracted features to enroll the user for biometric authentication using the biometric template,
wherein the user is not required to visit a central location for biometric enrollment.

7. The method of claim 6, the biometric template being usable with the unique device ID to authenticate the user for the service.

8. The method of claim 6, wherein validating further includes
sending the activation code to the server; and
receiving an indication of validity of the activation code from the server.

9. The method of claim 8, wherein receiving further includes receiving the activation code electronically from the server, wherein the activation code was generated by the server.

10. The method of claim 6, further comprising
receiving, with the user device, the biometric template from the server, the biometric template enabling the user device to authenticate the user.

11. A server for decentralized biometric enrollment, comprising:
a processor;
a memory communicatively coupled with the processor and storing machine readable instructions that when executed by the processor perform a set of operations comprising
receiving a request to enroll a user for biometric authentication in association with a unique device identifier (ID) of a user device;
generating an activation code corresponding to the unique device ID by encoding the activation code based upon one or both of an app running on the user device and the unique device ID;
sending the activation code to the user device of the user, the activation code enabling the user device to capture at least one biometric image;
receiving, from the user device, the at least one biometric image in response to the activation code;
extracting features from the at least one biometric image; and
generating a biometric template based upon the extracted features to enroll the user for biometric authentication without requiring the user to visit a central location to provide the at least one biometric image.

12. The server of claim 11, wherein the set of operations further includes sending the biometric template to the user device to enable the user device to authenticate the user.

13. The server of claim 11, wherein the set of operations further includes sending the biometric template to a device manufacturer server for configuration of the biometric template into an authentication capable device.

14. The server of claim 11, wherein the set of operations further includes encoding the unique device identifier (ID) of the user device within the activation code, wherein the app running on the user device validates the activation code based upon the unique device ID.

15. A non-transitory computer readable medium with computer executable instructions stored thereon is executed by a processor of a user device to perform the method of decentralized biometric enrollment, comprising:
instructions for receiving an activation code generated by a server and corresponding to a unique device identifier (ID) of the user device, the activation code uniquely identifying a user to a service, and the activation code based upon one or both of an app running on the user device and the unique device ID;
instructions for validating the activation code;
instructions for capturing at least one biometric image when the activation code is valid; and
instructions for sending the at least one biometric image to the server when the activation code is valid;
wherein the server extracts features from the at least one biometric image and generates a biometric template based upon the extracted features to enroll the user for biometric authentication using the biometric template,
wherein the user is not required to visit a centralized location for biometric enrollment.

16. The non-transitory computer readable medium of claim 15, the instructions for validating the activation code further comprising:
instructions for decoding the activation code to determine an encoded device identifier (ID); and
instructions for comparing the encoded device ID to the unique device identifier (ID) of the user device, the activation code being valid when the encoded device ID matches the unique device ID.

* * * * *